US011783490B2

(12) United States Patent
Ramanathan et al.

(10) Patent No.: US 11,783,490 B2
(45) Date of Patent: Oct. 10, 2023

(54) GROUND PLANE FILTERING OF VIDEO EVENTS

(71) Applicant: ObjectVideo Labs, LLC, Tysons, VA (US)

(72) Inventors: Narayanan Ramanathan, Chantilly, VA (US); Kyoung-Jin Park, Ellicott City, MD (US); Gang Qian, McLean, VA (US); Allison Beach, Leesburg, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 29 days.

(21) Appl. No.: 17/194,605

(22) Filed: Mar. 8, 2021

(65) Prior Publication Data

US 2021/0295054 A1    Sep. 23, 2021

Related U.S. Application Data

(60) Provisional application No. 62/991,887, filed on Mar. 19, 2020.

(51) Int. Cl.
*G06T 7/215* (2017.01)
*G06T 7/246* (2017.01)
(Continued)

(52) U.S. Cl.
CPC .............. *G06T 7/215* (2017.01); *G06T 7/246* (2017.01); *G06V 10/50* (2022.01); *G06V 20/41* (2022.01);
(Continued)

(58) Field of Classification Search
CPC ........ G06V 20/41; G06V 20/52; G06V 10/50; G06V 10/62; G06T 7/246;
(Continued)

(56) References Cited

U.S. PATENT DOCUMENTS 6,335,985 B1 * 1/2002 Sambonsugi ........... G06T 7/254
382/190
6,658,136 B1 * 12/2003 Brumitt ................. G06V 20/52
382/103

(Continued)

OTHER PUBLICATIONS

PCT International Search Report and Written Opinion in International Application. No. PCT/US2021/022315, dated May 25, 2021, 8 pages.

(Continued)

*Primary Examiner* — Kenny A Cese
(74) *Attorney, Agent, or Firm* — Fish & Richardson P.C.

(57) ABSTRACT

Methods, systems, and apparatus for ground plane filtering of video events are disclosed. A method includes obtaining a first set of images of a scene from a camera; determining a ground plane from the first set of images of the scene; obtaining a second set of images of the scene after the first set of images of the scene is obtained; determining that movement shown by a group of pixels in the second set of images of the scene satisfies motion criteria; determining that the ground plane corresponds with at least a portion of the group of pixels; and in response to determining that movement shown by the group of pixels in the second set of images of the scene satisfies motion criteria, and that the ground plane corresponds with at least a portion of the group of pixels, classifying the group of pixels as showing ground plane based motion.

20 Claims, 4 Drawing Sheets

(51) Int. Cl.
*G06V 20/40* (2022.01)
*G06V 20/52* (2022.01)
*G06V 10/62* (2022.01)
*G06V 10/50* (2022.01)

(52) U.S. Cl.
CPC .... *G06V 20/52* (2022.01); *G06T 2207/10016* (2013.01); *G06T 2207/30232* (2013.01); *G06V 10/62* (2022.01)

(58) Field of Classification Search
CPC . G06T 2207/10016; G06T 2207/30232; G06T 7/215
See application file for complete search history.

(56) References Cited

U.S. PATENT DOCUMENTS

| | | | |
|---|---|---|---|
| 10,169,665 | B1 | 1/2019 | Zhang et al. |
| 10,600,204 | B1* | 3/2020 | Rush ................... A61B 5/746 |
| 2009/0096879 | A1* | 4/2009 | Motomura ............ H04N 23/68 |
| | | | 348/208.6 |
| 2010/0322476 | A1* | 12/2010 | Kanhere .............. G06V 10/763 |
| | | | 382/103 |
| 2011/0228985 | A1* | 9/2011 | Uchida .................. G06T 7/215 |
| | | | 382/103 |
| 2013/0201330 | A1 | 8/2013 | Thornton et al. |
| 2014/0254919 | A1* | 9/2014 | Sun ....................... G06T 7/194 |
| | | | 382/154 |
| 2015/0213617 | A1* | 7/2015 | Kim ........................ G06T 7/73 |
| | | | 382/103 |
| 2017/0084052 | A1 | 3/2017 | Olsson et al. |
| 2018/0046858 | A1* | 2/2018 | Chen ....................... G06T 7/11 |
| 2018/0364717 | A1* | 12/2018 | Douillard .............. G05D 1/024 |
| 2020/0029013 | A1* | 1/2020 | Stanard ................. H04N 23/61 |
| 2020/0084353 | A1 | 3/2020 | Wacey |

OTHER PUBLICATIONS

Extended European Search Report in European Appln. No. 21770480.8, dated Aug. 18, 2023, 9 pages.

* cited by examiner

GROUND PLANE FILTERING OF VIDEO EVENTS

CROSS-REFERENCE TO RELATED APPLICATIONS

This application claims the benefit of the U.S. Provisional Patent Application No. 62/991,887 filed Mar. 19, 2020, which is incorporated herein by reference in its entirety.

TECHNICAL FIELD

This disclosure application relates generally to surveillance cameras.

BACKGROUND

Many properties are equipped with monitoring systems that include sensors and connected system components. Some property monitoring systems include cameras.

SUMMARY

Techniques are described for ground plane filtering of video events.

Many residents and homeowners equip their properties with monitoring systems to enhance the security, safety, or convenience of their properties. A property monitoring system can include one or more cameras that can obtain visual images of scenes at the property. A camera can be incorporated into a component of the property monitoring system, e.g., a doorbell camera.

A camera can detect motion events and generate alerts to send to a resident of a property based on the detected motion events. In some examples, movement detected by the camera can trigger the property monitoring system to perform one or more actions. For example, movements that meet pre-programmed criteria may trigger the property monitoring system to send a notification to a resident of the property or to adjust a setting of the property monitoring system. Example criteria can include an object approaching the property within a certain range or at a certain speed, or an object passing by or approaching the property late at night.

The resident of the property may primarily be concerned with camera motion events that indicate activities of people at the property. For example, the resident may be interested in receiving alerts and notifications related to events that include people approaching the property, people delivering packages to the property, etc. In contrast, the resident may be less concerned with other motion events that may be captured by the camera, such as moving foliage, flags, wind chimes, and birds.

In general, motion events of interest to the resident often take place on ground, e.g., on a yard, driveway, street, sidewalk, or floor. For example, a person approaching the property may be walking on the ground, riding a scooter on the ground, or riding a bicycle on the ground. Therefore, in accordance with the resident's programmed preferences and settings, motion events that occur on the ground may be classified as motion events of interest. In contrast, motion events that occur off of the ground can be classified as non-interest events.

It is desirable for the resident to receive alerts that are of interest to the resident, and to reduce the number of false alerts, or non-interest alerts, sent to the resident. To reduce false alerts, the monitoring system can be configured to filter out motion events that do not take place on or near the ground. The monitoring system can then send alerts to the resident only for motion events of interest, e.g., motion events that occur on the ground.

To filter out motion events that do not take place on the ground, the monitoring system can first analyze images of a scene captured by the camera to determine a ground plane. The monitoring system can use pre-trained scene segmentation models to identify different components of the scene. The monitoring system can derive a binary view of the scene, including demarcations between ground plane segments and non-ground plane segments. The ground plane includes components of the scene that represent ground, e.g., streets, yards, sidewalks, etc. The ground plane does not include components of the scene that do not represent ground, e.g., sky, trees, buildings, etc.

Once the monitoring system determines the ground plane of the scene, the camera can determine an intersection of each motion event with the ground plane. Upon detecting motion, the camera can apply a ground-plane based motion filter to verify that the motion event overlaps with the ground plane. If the motion event meets criteria for intersection with the ground plane, the camera can classify the motion event as a motion event of interest. If the motion event does not meet criteria for intersection with the ground plane, the camera can classify the motion event as a non-interest motion event.

In response to the camera detecting a motion event of interest, the monitoring system can determine to take one or more actions. For example, the monitoring system may send an alert to the resident via a mobile device or a control panel of the monitoring system. In some examples, the monitoring system may activate additional sensors in response to detecting the motion event of interest.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
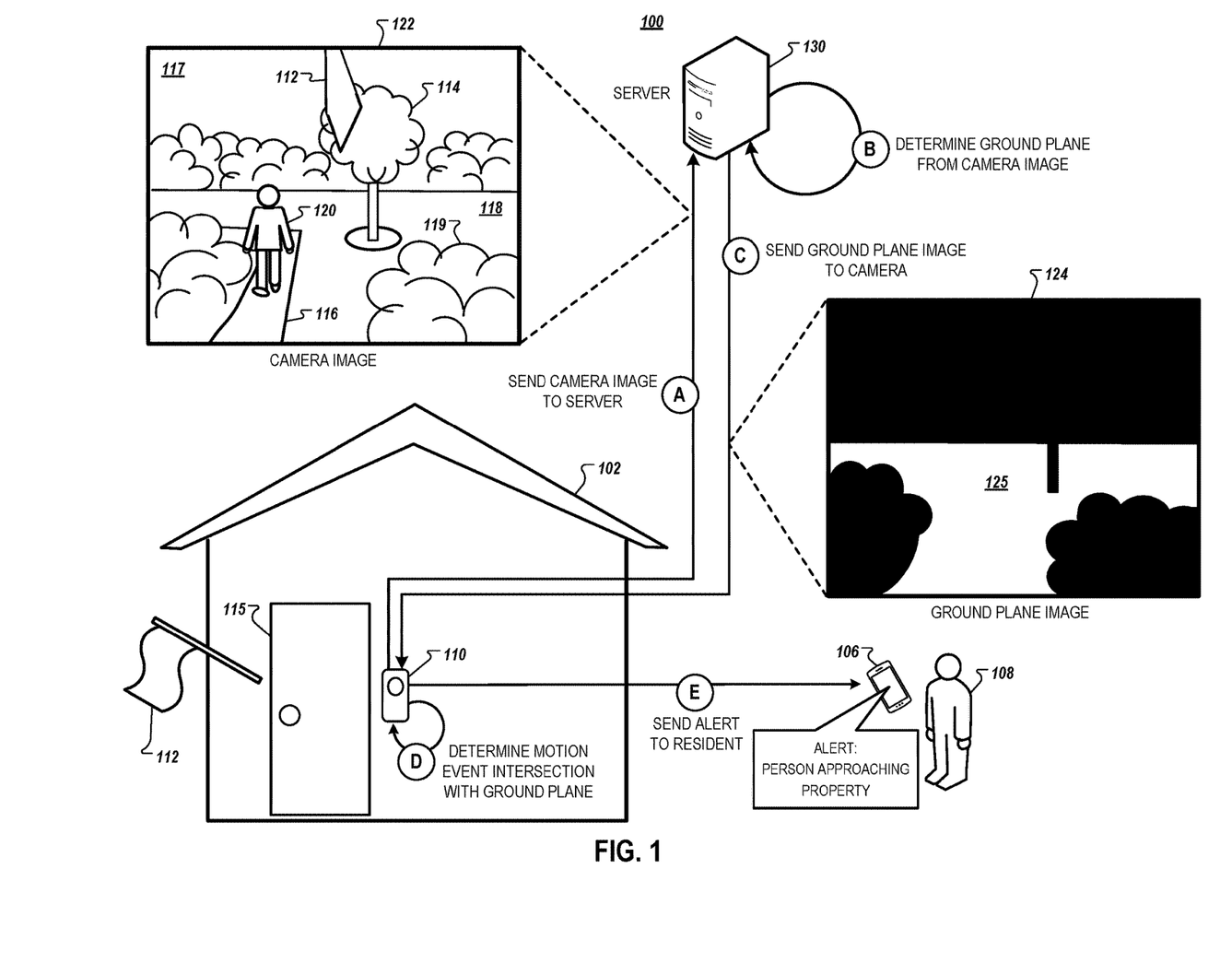
FIG. 1 illustrates an example system for ground plane filtering of video events using a doorbell camera.

FIG. 1 illustrates an example system 100 for ground plane filtering of video events using a doorbell camera. The system 100 includes a camera 110 installed at a property 102, and a monitoring server 130. The property 102 can be a home, another residence, a place of business, a public space, or another facility that has one or more cameras 110 installed. The camera 110 is shown in FIG. 1 as a component of a doorbell that is installed external to the property 102. However, the camera 110 may also be separate from a doorbell. For example, the camera 110 may be installed a few inches from the doorbell. The doorbell is installed near a front door 115 of the property 102. In some examples, the doorbell is a component of a monitoring system that collects data from various sensors in order to monitor conditions and events at the property 102.

In addition to the camera 110, the doorbell may include other components and sensors. For example, the doorbell may include a button that, when depressed, causes an audible tone to sound at the property 102. The doorbell may also include additional sensors, e.g., a motion sensor, a temperature sensor, a light sensor, and a microphone.

The camera 110 captures video from a scene within a field of view. The video includes multiple consecutive camera images, or frames. The video can include any type of images. For example, the video can include visual light images, infrared images, or radio wave images. In some examples, the video can include a combination of one or more types of images, e.g., visual light images with infrared illumination.

The field of view is an area that is observable by the camera 110. The camera 110 has a field of view that includes the area in front of the property 102. The field of view includes a yard 118, a walkway 116, a flag 112, bushes 119, and a tree 114 in front of the property 102.

In some examples, the camera 110 can capture video continuously. In some examples, the camera 110 can capture video when triggered by an event. For example, the camera 110 may capture video when triggered by depression of the button on the doorbell. In some examples, the camera 110 may capture video when triggered by activation of the motion sensor or other sensor of the doorbell.

The camera 110 may capture video for a preprogrammed amount of time. For example, when triggered by depression of the button on the doorbell, the camera 110 may capture video for a preprogrammed time of 10 seconds, 30 seconds, or 60 seconds. When triggered by a motion sensor, the camera 110 may capture video for a preprogrammed time and/or may capture video until the motion sensor no longer detects motion.

In some examples, the camera 110 can include a pre-event buffer and a post-event buffer. The camera 110 can save video images captured over a preprogrammed amount of time in the pre-event buffer. For example, the camera 110 can save the most recent 5 seconds, 10 seconds, or 15 seconds of video in the pre-event buffer. The camera 110 may continually update the video stored in the pre-event buffer. When triggered by an event, the camera 110 can save subsequent video images in the post-event buffer. The video stored in the pre-event buffer and the post-event buffer can be provided to a user, e.g., as part of a notification of the event, in order to provide context for the event.

The camera 110 can perform video analysis on captured video. Video analysis can include detecting, identifying, and tracking objects in the video. The camera 110 may include an object detector that can detect the presence of moving objects within a frame, and a motion detector that can detect motion patterns of objects of interest. When the object detector detects an object, the object detector can identify a bounding box around the image of the object in the frame. The camera 110 may include an object tracker that can track object movement from one frame to a consecutive frame. The object tracker can track the bounding boxes of existing objects in each subsequent frame.

The system 100 includes a remote server 130. In some examples, the camera 110 communicates electronically with the server 130 through a control unit at the property 102. In some examples, the camera 110 can send data, e.g., camera images, directly to the server 130. To support communications with the server 130, the camera 110 may include communications modules, such as a modem, transceiver, modulator, or other hardware or software configured to enable the device to communicate electronic data through a network.

In some implementations, a resident 108 of the property 102, or another user, communicates with the camera 110, the server 130, or both, through a network connection. In some implementations, the resident 108 or other user communicates with the camera 110 through a software ("smart home") application installed on a mobile device 106.

The server 130 can be, for example, one or more computer systems, server systems, or other computing devices. In some implementations, the server 130 is a cloud computing platform. The camera 110 may communicate with the server 130 via a long-range data link. The long-range data link can include any combination of wired and wireless data networks. For example, the camera 110 may exchange information with the server 130 through a wide-area-network (WAN), a cellular telephony network, a cable connection, a digital subscriber line (DSL), a satellite connection, or other electronic means for data transmission. The camera 110 and the server 130 may exchange information using any one or more of various communication synchronous or asynchronous protocols, including the 802.11 family of protocols, GSM, 3G, 4G, 5G, LTE, CDMA-based data exchange or other techniques.

In the example of FIG. 1, a person 120 approaches the front door 115 of the property 102. The camera 110 captures video that includes the camera image 122. The camera 110 may capture the video including the camera image 122, for example, upon being triggered by a motion sensor, video-based motion detector, or object detector that detects the motion of the person 120. The camera 110 may also capture the video including the camera image 122, for example, as part of a constant capturing of frames, or upon a doorbell button being pressed. The camera image 122 includes an image of the person 120. The camera image 122 also includes images of background objects, including the tree 114 and the walkway 116, as well as images of foreground objects, including the flag 112.

In stage (A) of FIG. 1, the camera 110 sends the camera image 122 to the server 130. The camera 110 can select a number of camera images, e.g., five, ten, or fifteen images, to send to the server 130 for ground plane analysis. The camera 110 can select the camera images based on pre-programmed criteria. Criteria can include, for example, illumination level of the camera images, absence of moving objects in the camera images, and stillness of the camera 110.

The camera 110 may select the camera images based on illumination level criteria. In some examples, the camera 110 selects a number of camera images captured during a time period, e.g., an hour, a day, or a week. In some examples, the camera 110 can select camera images captured at various times of day when illumination is above a threshold illumination. To determine if the illumination is above the threshold illumination, the camera 110 can convert red-green-blue (RGB) image data for the camera image to luminance (LUV) data and extract the "L" value. If the median value of L is above a threshold value, e.g., one hundred, the camera 110 can classify the camera image as "well illuminated."

The camera 110 may select the camera images based on an absence of moving objects. For example, the camera 110 can run a pre-trained object detector on camera images captured during a time period. In some examples, the camera 110 may run the object detector on the camera images after determining that the camera images are well illuminated, as described above. The object detector can identify objects in the camera images and can generate a bounding box around each object. The bounding box can be an area of the camera image where the object is positioned, and can coarsely outline the object using, for example, a rectangular shape. Once the camera 110 has generated the bounding boxes around the objects, the camera 110 can track movement of the objects by tracking movement of the bounding boxes. The camera 110 can then select images that do not include moving objects, e.g., that do not include moving people, vehicles, or animals.

The camera 110 may select the camera images based on stillness of the camera 110. For example, the camera 110 can run a feature-matching algorithm between image frames captured by the camera to determine if movement occurred between the image frames. In some examples, in addition to or instead of the feature-matching algorithm, the camera 110 can run one or more of a background subtraction algorithm, an optical flow estimation algorithm, or a deep motion detection algorithm to determine if movement occurred between the image frames.

In some examples, the camera 110 can run a scale-invariant feature transform (SIFT) algorithm on camera images captured during a time period. In some examples, the camera 110 may run the SIFT algorithm on the camera images after determining that the camera images are well illuminated, after determining that the camera images do not include moving objects, or both. Based on results of the feature-matching algorithm, the camera 110 can determine if the camera 110 underwent a movement drift while capturing the images, or if the camera 110 remained still. The camera 110 can then select images that were captured while the camera 110 was still.

In some examples, the camera 110 may send the camera images to the server 130 at pre-programmed intervals, e.g., once per day, or once per week. In some examples, the camera 110 may send the camera images to the server 130 in response to an event. For example, the camera 110 may send the camera images to the server 130 in response to a repositioning of the camera 110, or in response to the camera 110 detecting a new object within the field of view, e.g., a new tree planted in a yard.

In stage (B) of FIG. 1, the server 130 determines a ground plane from the camera images. A ground plane includes segments of the camera image that represent ground, e.g., a yard, street, or walkway. To determine the ground plane, the server 130 can run a pre-trained scene-segmentation algorithm on the camera images sent to the server 130.

Using the scene-segmentation algorithm, the server 130 can classify each pixel of the camera images. For example, the server 130 can classify each pixel of the scene in camera image 122 as showing a component of the tree 114, the walkway 116, the yard 118, a sky 117, the bushes 119, the flag 112, etc. The server 130 can assimilate scene labels for each pixel from different camera images and can fuse the scene labels into a single fused scene-segmentation output.

The fused segmentation output can include multiple scene labels, e.g., building, sky, trees, plants, pillar, railings, ground, earth, road, sidewalk, driveway, and porch. The labels can be categorized as ground-plane labels and non-ground plane labels. For example, the pre-trained algorithm may classify ground, road, sidewalk, driveway, walkway, and porch as ground plane labels. The algorithm may classify building, sky, trees, plants, pillar, and railings as non-ground plane labels.

The server 130 can determine the ground plane occasionally, e.g., in response to the camera 110 moving. For example, the resident 108 may occasionally reposition the camera 110, or wind may cause the camera 110 to move. In some examples, the camera 110 can reposition automatically, e.g., in response to detecting events in a certain portion of the field of view, or in response to a portion of the field of view being obstructed. The camera 110 can include a SIFT threshold for triggering re-determination of the ground plane. For example, the SIFT threshold may be the camera 110 repositioning by five degrees or more. If the camera 110 moves an amount greater than the SIFT threshold, the camera 110 can send a number of new camera images to the server 130, and the server 130 can determine the ground plane from the new camera images.

In stage (C) of FIG. 1, the server 130 sends a ground plane image 124 to the camera 110. The ground plane image 124 can be a binary segmentation ground plane image, generated based on the ground plane labels and the non-ground plane labels. For example, pixels with ground plane labels can be shaded a first color, e.g., white, while pixels with non-ground plane labels can be shaded a second color, e.g., black. The ground plane image 124 can show a clear demarcation between ground plane and non-ground plane labeled pixels.

In the ground plane image 124, the ground plane labeled pixels are shaded white, while the non-ground plane labeled pixels are shaded black. The ground plane 125 includes portions of the ground plane image 124 that correspond to the yard 118 and the walkway 116 of the camera image 122. The non-ground plane pixels include portions of the ground plane image 124 that correspond to the sky 117, the tree 114, the flag 112, and the bushes 119 of the camera image 122.

In stage (D) of FIG. 1, the camera 110 determines motion event intersection with the ground plane 125. The camera 110 can detect motion events and compare the motion events with the ground plane 125 of the ground plane image 124. The camera 110 can classify motion events that intersect with the ground plane 125 as motion events of interest, and can classify motion events that do not intersect with the ground plane 125 as non-interest motion events.

Figure 2A:
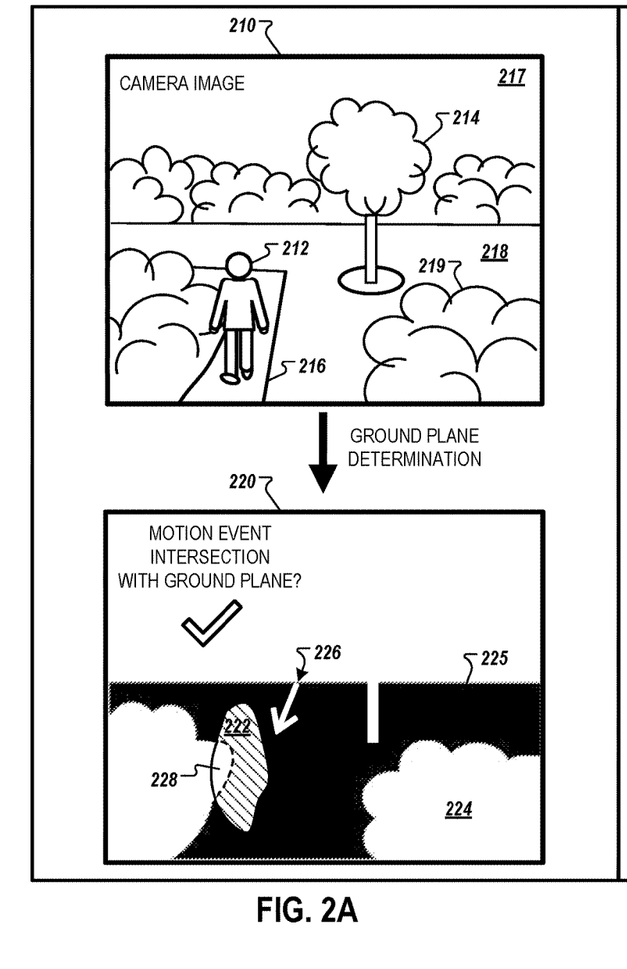
FIGS. 2A and 2B illustrate example ground plane images with an intersecting motion event and a non-intersecting motion event, respectively.
Figure 2B:
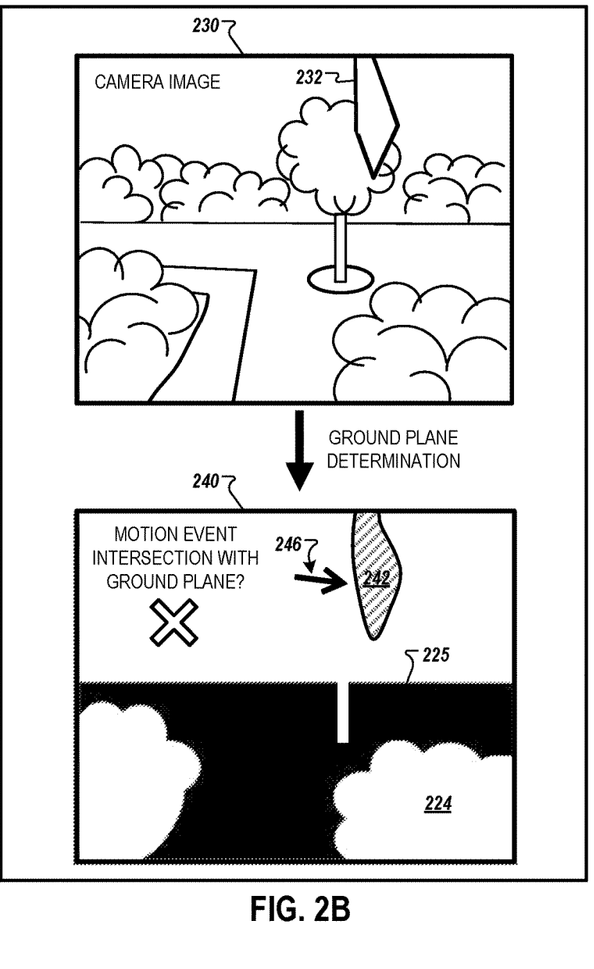

Examples of a camera determining motion event intersection with a ground plane are shown in FIGS. 2A and 2B. FIGS. 2A and 2B illustrate example ground plane images with an intersecting motion event and a non-intersecting motion event, respectively.

In FIG. 2A, camera image 210 shows a person 212 approaching a camera, e.g., the camera 110, on a walkway 216. A server, e.g., the server 130, can determine the ground plane of the scene in the camera image 210 based on analyzing a number of camera images captured by the camera, as described with reference to stage (B) of FIG. 1. Once the server determines the ground plane, the server can send ground plane image 220 to the camera. The ground plane image 220 shows a ground plane 225 shaded in black, and non-ground plane segments 224 shaded in white.

In some examples, the camera includes a motion detector. The motion detector can detect motion cues in consecutive camera images, e.g., image frames, captured by the camera. For example, the motion detector can detect motion cues in consecutive camera images for the pixels showing the person 212 approaching. The motion detector can then determine location, speed, and direction of motion flow between the consecutive camera images.

To determine the speed and direction of motion flow, the motion detector can estimate dense optical flow magnitude in the consecutive camera images. Pixels with a flow magnitude lower than a pre-programmed threshold can be classified as non-motion pixels. Pixels with a flow magnitude equal to or above the pre-programmed threshold can be classified as motion pixels.

For example, clouds moving through the sky may have movement, but the flow magnitude may be lower than the threshold flow magnitude. Thus, pixels corresponding to the clouds can be classified as non-motion pixels. In contrast, the person 212 walking may have a flow magnitude greater than the threshold flow magnitude. Pixels corresponding to the person 212 can therefore be classified as motion pixels. The motion pixels form a motion blob 222 that corresponds to the location of the person 212 in the camera image 210.

Once the motion detector has identified the motion pixels, the motion detector can sort the motion pixels into two or more categories, or bins, based on flow orientation of each pixel. The bins can correspond to a direction of motion. The direction of motion can be described in reference to a reference direction at zero degrees, e.g., horizontal to the right. A reciprocal of the reference direction is then one hundred-eighty degrees, e.g., horizontal to the left.

In some examples, the motion detector can sort the motion pixels into six bins. Each of the six bins can include pixels with flow orientation within a range of thirty degrees, and their reciprocal orientations. For example, a first bin can include pixels with flow orientation between zero and thirty degrees, as well as between one hundred-eighty and two hundred-ten degrees. A second bin can include pixels with flow orientations between thirty and sixty degrees, and between two hundred-ten and two-hundred forty degrees, etc.

The motion blob 222 is moving in a direction represented by arrow 226. The arrow 226 is in a direction of approximately one hundred-fifteen degrees from the reference direction. Pixels of the motion blob 222 are therefore sorted into a bin that includes flow orientations between ninety and one hundred-twenty degrees, e.g., a fourth bin of the six bins.

Once the pixels are sorted according to flow orientations, the camera can run a connected component analyzer to estimate sizes of motion blobs, or clusters, within the camera image 210. Each motion blob can include multiple adjacent pixels with similar flow orientation, e.g., within the same bin. To determine the size of each motion blob, the connected component analyzer estimates the number of adjacent pixels that are within the same bin, e.g., the number of pixels moving in unison.

In some examples, the connected component analyzer can estimate a percentage of adjacent pixels that are within the same bin. For example, all pixels within a motion blob might not have optical flow in the same direction. Some of the pixels within a motion blob may have no optical flow, or may have optical flow in various directions. This can occur, for example, if the motion blob includes pixels corresponding to two different people located near each other, moving in different directions. This can also occur when a part of an object is moving in a different direction than the overall object motion, e.g., a bird moving in one direction, with wings flapping in a different direction. The connected component analyzer can determine a number of pixels, or a percentage of pixels, of the motion blob that are moving in unison. The connected component analyzer can then determine the size of the motion blob and the overall motion direction of the motion blob, and can distinguish individual motion blobs from each other.

The camera can filter the motion blobs according to the estimated sizes. Motion blobs that are smaller, e.g., that include fewer pixels, than a minimum blob size threshold can be filtered out. Motion blobs that are larger than the minimum blob size threshold can be selected as potential motion events of interest. For example, a leaf blowing in the wind may have movement of sufficient optical flow magnitude, but a corresponding motion blob may not be larger than the minimum blob size threshold. The leaf will therefore be filtered out due to the small size of the motion blob. The motion blob 222 corresponding to the person 212 may be larger than the minimum blob size threshold, and may therefore be selected as a potential motion event of interest.

The camera can perform additional analysis on the motion blobs that are selected, in order to identify motion events of interest. The camera can compare a selected motion blob, e.g., the motion blob 222, with the ground plane 225. The camera can determine if any pixels of the motion blob 222 intersect with the ground plane 125. Motion blobs that meet criteria for intersection with the ground plane 125 can be classified as motion events of interest.

In some examples, criteria for intersection with the ground plane 125 can include at least one pixel of the motion blob intersecting with the ground plane 125. In some examples, criteria can include a number of pixels of the motion blob that intersect with the ground plane 125 exceeding a threshold number of pixels. In some examples, criteria for intersection with the ground plane 125 can include a percentage of pixels of the motion blob that intersect with the ground plane 125 exceeding a threshold percentage. The threshold percentage can be, for example, thirty percent, forty percent, or fifty percent.

For example, the threshold percentage in the example of FIG. 2A may be fifty percent. A portion 228 of the motion blob 222 does not intersect with the ground plane 225, while the remainder of the motion blob 222 does intersect with the ground plane 225. Specifically, greater than fifty percent of the motion blob 222 intersects with the ground plane 225. The camera can thus determine that the motion blob 222 represents a motion event of interest based on the percentage of the motion blob 222 that intersects with the ground plane 225 exceeding the threshold percentage.

In some examples, certain pixels of the motion blob 222 may be weighted more than other pixels in determining intersection with the ground plane 225. For example, the camera may weight pixels within a lower portion of the motion blob 222 greater than pixels within an upper portion of the motion blob 222. The camera may weight the lower pixels more than the upper pixels in order to determine if a "footprint" of the motion blob 222 intersects with the ground plane 225. A footprint of the motion blob 222 intersecting with the ground plane can indicate that a person is walking on the ground, even though an upper portion of the motion blob 222, e.g., a portion that corresponds with a person's torso, might not intersect with the ground plane 225.

In some examples, the camera includes a person detector. The person detector can detect a person in the camera image 210 and can generate a bounding box around the person. The camera can then estimate the dense optical flow in consecutive camera images for pixels within the bounding box. The camera can ignore pixels outside the bounding box. If an average optical flow magnitude of pixels within the bounding box exceeds a preset threshold, the pixels within the bounding box can be classified as motion pixels.

The camera can then evaluate a size of the bounding box. If the size of the bounding box exceeds a threshold bounding box size, the detection can be classified as a potential motion event of interest. The camera can then evaluate the intersection of the bounding box with the ground plane. If the intersection of the bounding box with the ground plane meets intersection criteria, the camera can classify the event as a motion event of interest.

In FIG. 2B, camera image 230 shows a flag 232 waving in a breeze. A server can determine the ground plane of the camera image 230 based on analyzing a number of camera images captured by the camera, as described with reference to stage (B) of FIG. 1. The server can send ground plane image 240 to the camera. The ground plane image 240 shows a ground plane 225 shaded in black, and non-ground plane segments 224 shaded in white.

As described with reference to FIG. 2A, a motion detector of the camera can detect motion cues in consecutive camera images for the pixels showing the flag 232 waving. The motion detector can estimate dense optical flow magnitude in the consecutive camera images. The flag 232 waving may have a flow magnitude greater than the threshold flow magnitude. Pixels corresponding to the flag 232 can therefore be classified as motion pixels. The motion pixels form a motion blob 242 that corresponds to the location of the flag 232 in the camera image 230.

The motion blob 242 is moving in a direction represented by arrow 246. The arrow 246 is in a direction of approximately ten degrees from the reference direction. Pixels of the motion blob 242 can then be sorted into a bin that includes flow orientations between zero and thirty degrees, e.g., the first bin of the six bins.

Once the pixels are sorted according to flow orientations, the camera can run the connected component analyzer to estimate sizes of motion blobs within the camera image 122. The motion blob 242 corresponding to the flag 232 may larger than the minimum blob threshold, and may therefore be selected as a potential motion event of interest.

The camera can perform additional analysis on the motion blob by comparing the motion blob 242 with the ground plane 225. The camera can determine if any pixels of the motion blob 242 intersect with the ground plane 125. Motion blobs that meet criteria for intersection with the ground plane 125 can be classified as motion events of interest.

In FIG. 2B, criteria for intersection with the ground plane 125 include a threshold percentage of fifty percent of the pixels intersecting with the ground plane 125. Zero percent of the pixels of the motion blob 242 intersect with the ground plane 225. The camera can thus determine that the motion blob 242 does not represent a motion event of interest based on the percentage of the motion blob 242 that intersects with the ground plane 225 being less than the threshold percentage.

In response to detecting a motion event of interest, as shown in FIG. 2A, the monitoring system can perform one or more actions. For example, referring back to FIG. 1, in stage (E), the camera 110 sends an alert to the resident 108. In some examples, the camera 110 may send the alert to the mobile device 106 associated with the resident 108. In some examples, the camera 110 may send the alert via a mobile application or text message. The alert can include a message stating that a person is approaching the property.

In some examples, in addition to sending the alert to the resident 108, the system 100 may perform one or more actions in response to detecting the motion event of interest. For example, the system may activate one or more additional sensors, e.g., motion sensors, additional cameras, microphones, etc. In some examples, the system may perform automatic actions such as turning on a porch light or ringing the doorbell.

Though described above as being performed by a particular component of the system 100 (e.g., the camera 110 or the monitoring server 130), any of the various control, processing, and analysis operations can be performed by either the camera 110, the monitoring server 130, or another computer system of the system 100. For example, the system 100 may include a control unit at the property 102. The control unit may be configured to monitor and control various sensors and devices at the property 102. The control unit may communicate with the camera 110 and other sensors over a wireless network at the property 102. The control unit, the monitoring server 130, the camera 110, and/or another computing system can determine the ground plane image, detect motion events, determine motion event intersection with the ground plane, etc. For example, a system may not include the monitoring server 130 and the control unit may perform all the functions described for the monitoring server 130. In another example, the camera 110 may determine the ground plane image from images instead of receiving a ground plane image determined by the server 130. In yet another example, the server 130 may determine the ground plane image and the control unit may determine motion event intersection with the ground plane instead of the camera 110.

Figure 3:
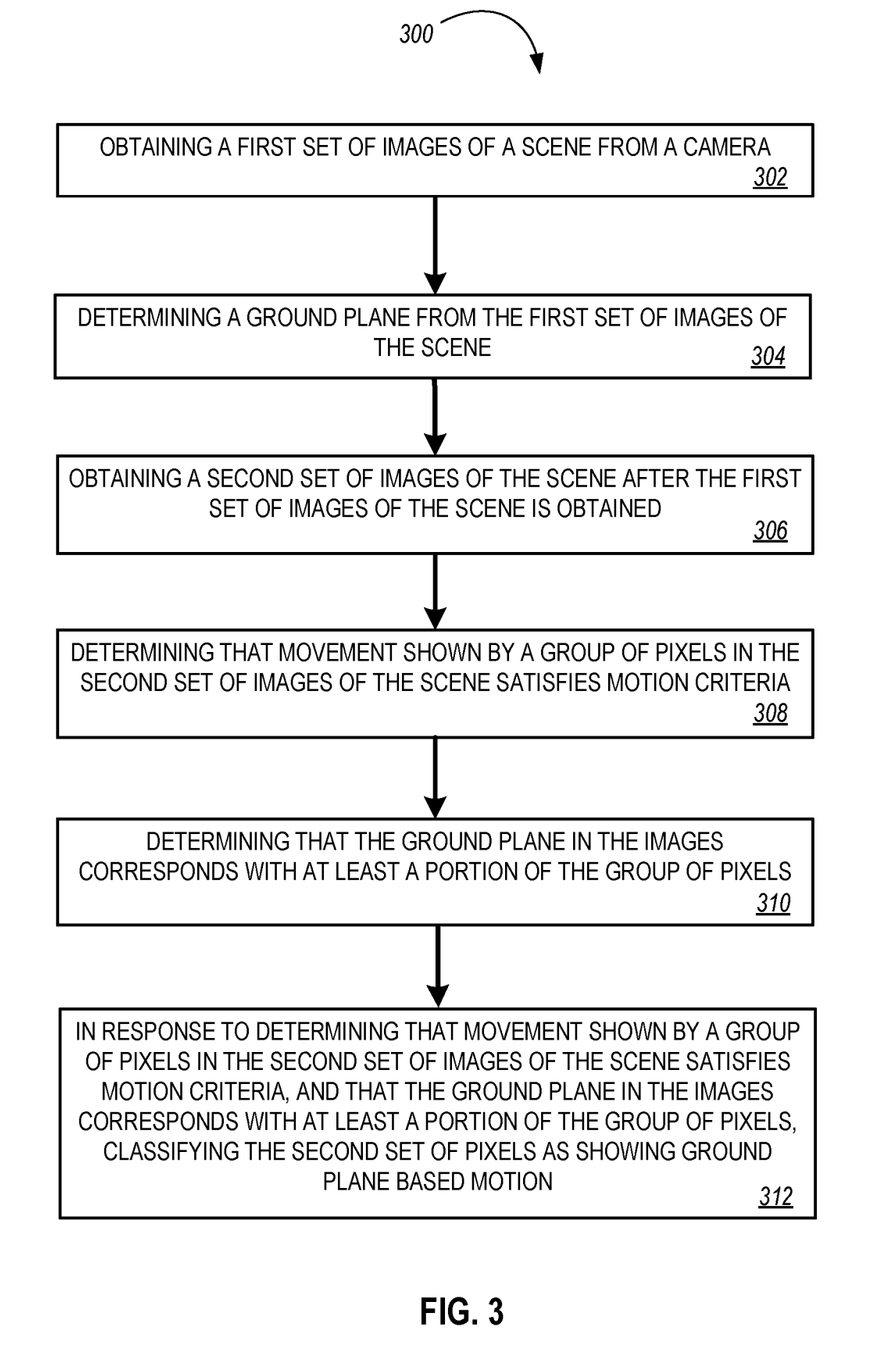
FIG. 3 is a flow chart illustrating an example of a process for ground plane filtering of video events.

FIG. 3 is a flow chart illustrating an example of a process 300 for ground plane filtering of video events. The process 300 can be performed by a computing system such as a camera, a server, or a control unit. In some implementations, the process 300 can be performed by a camera, e.g. the camera 110. In some implementations, the process 300 can be performed by one or more computer systems that communicate electronically with a camera, e.g., the server 130. In some implementations, some steps of the process 300 can be performed by one computing system, e.g., the camera 110, and other steps of the process 300 can be performed by another computing system, e.g., the server 130.

Briefly, process 300 includes obtaining a first set of images of a scene from a camera (302), determining a ground plane from the first set of images of the scene (304), obtaining a second set of images of the scene after the first set of images of the scene is obtained (306), determining that movement shown by a group of pixels in the second set of images of the scene satisfies motion criteria (308), determining that the ground plane corresponds with at least a portion of the group of pixels (310), and in response to determining that movement shown by the group of pixels in the second set of images of the scene satisfies motion criteria, and that the ground plane corresponds with at least a portion of the group of pixels, classifying the second set of pixels as showing ground plane based motion (312).

In additional detail, the process 300 includes obtaining a first set of images of a scene from a camera (302). For example, the camera 110 can capture a first set of images and send the first set of images to the server 130. The first set of images may include images of one or more background objects in the scene, e.g., of streets, foliage, and buildings. The first set of images may be selected based on a number of criteria. Criteria can include an illumination level, an absence of moving objects, and a stillness of the camera. The first set of images may be consecutive image frames, or may be captured at different times.

In some implementations, the first set of images includes one or more images that were each selected based on image criteria. The image criteria can include criteria for an illumination level, such as a minimum illumination level. The image criteria can include criteria for a level of camera stillness, such as a maximum amount of camera movement. The image criteria can include criteria for an amount of detected object motion in an image, such as a maximum amount of motion detected in the images.

In some implementations, each image of the first set of images includes a plurality of scene segments, each scene segment including a group of pixels in the image that correspond to the same object in the scene. For example, the first set of images that includes the camera image 122 may have a scene segment including a group of pixels in the image that correspond to the tree 114. The first set of images may also have a scene segment corresponding to the walkway 116, and a scene segment corresponding to the bushes 119.

The process 300 includes determining a ground plane from the first set of images of the scene (304). For example, the server 130 can determine the ground plane 125 from the first set of images. The ground plane can include one or more areas of the scene that represents the ground or floor of the scene. Ground plane areas can include, for example, streets, sidewalks, driveways, fields, or floors. In some implementations, determining the ground plane includes classifying pixels in the images as showing particular types of objects, and then identifying the ground plane based on identifying the pixels classified as showing types of objects that are part of the ground. For example, the server 130 may determine a pixel shows a bush so determine that pixel is not part of the ground plane and determine another pixel shows a walkway so determine that pixel is part of the ground plane.

In some implementations, determining the ground plane from the first set of images of the scene includes, for each scene segment, assigning a label indicating an object that the scene segment depicts. For example, the system may assign a label "bushes" to the scene segments corresponding to the bushes 119. The system may assign a label "walkway" to the scene segment corresponding to the walkway 116 and a label "yard" to the scene segment corresponding to the yard 118. Based on the label indicating the object that the scene segment depicts, the system can classify the scene segment as a ground-plane segment or a non-ground plane segment. For example, the system can classify the scene segment corresponding to the yard as a ground-plane segment based on the label "yard." The system can classify the scene segments corresponding to the bushes 119 as non-ground plane segment based on the label "bushes."

In some implementations, determining the ground plane from the first set of images of the scene includes generating a ground plane image. The ground plane image can include a ground plane including the ground-plane segments and a non-ground plane including the non-ground plane segments. For example, the ground plane image 220 includes a ground plane 225 including the ground-plane segments corresponding to the walkway 216 and the yard 218. The ground plane image 220 also includes a non-ground plane including the non-ground plane segments 224 corresponding to the tree 214, the bushes 219, and the sky 217.

In some implementations, each pixel of the ground plane in the ground plane image has a first pixel value and each pixel of the non-ground plane in the ground plane image has a second pixel value. For example, each pixel of the ground plane 225 has a first pixel value corresponding to black, e.g., a pixel value of zero. Each pixel of the non-ground plane 224 has a second pixel value corresponding to white, e.g., a pixel value of two hundred fifty-five.

In some implementations, determining that the ground plane corresponds with at least a portion of the group of pixels includes identifying pixels of the group of pixels that correspond to ground plane pixels in the ground plane image. For example, determining that the ground plane 225 corresponds with at least a portion of the group of pixels corresponding to the motion blob 222 includes identifying pixels of the motion blob 222 that correspond to ground plane pixels in the ground plane image 220. In the example of FIG. 2A, the portion of the motion blob 222 that corresponds to the ground plane pixels include the pixels within the motion blob 222 that are outside of the portion 228.

In some implementations, identifying pixels of the group of pixels that correspond to ground plane pixels in the ground plane image includes identifying pixels of the group of pixels that have the first pixel value in the ground plane image. For example, identifying pixels of the motion blob 222 that correspond to ground plane pixels in the ground plane image 220 can include identifying pixels of the motion blob 222 that have a pixel value of zero in the ground plane image.

The process 300 includes obtaining a second set of images of the scene after the first set of images of the scene is obtained (306). For example, the camera 110 can capture the second set of images. The second set of images may include consecutive image frames showing one or more moving objects, e.g., the person 120 of the camera image 122.

The process 300 includes determining that movement shown by a group of pixels in the second set of images of the scene satisfies motion criteria (308). For example, the camera 110 can identify a group of pixels corresponding to the person 120 in a final frame of the second set of images. The camera 110 can then evaluate movement shown by the group of pixels in the second set of images. The group of pixels can be considered a "motion blob." The camera 110 can evaluate the movement shown by the group of pixels using, for example, optical flow analysis performed on consecutive image frames. The camera 110 can then determine that the movement satisfies the motion criteria. Motion criteria can include, for example, a threshold number of pixels moving in unison in a similar direction, and a threshold speed of movement.

In some implementations, determining that movement shown by a group of pixels in the second set of images of the scene satisfies motion criteria includes selecting the group of pixels by determining, for each pixel in the second set of images, a motion flow for the pixel. For example, the system can determine a motion flow for each pixel in the second set of images that includes the image 210. Based on the motion flow for each pixel, the system can classify each pixel as a motion pixel or a non-motion pixel. For example, the system can classify pixels of the motion blob 222 as motion pixels, and pixels depicting the sky 217 as non-motion pixels. The process 300 can include identifying a cluster of motion pixels in the second set of images based on a (i) a similarity of flow orientation of the motion pixels to each other and (ii) a proximity of the motion pixels to each other. For example, the system can identify the cluster of motion pixels of the motion blob 222 based on a similarity of flow orientation in the direction of arrow 226 and based on the motion pixels of the motion blob 222 being adjacent to one another. In these implementations, the pixels of the cluster of motion pixels are included in the selected group of pixels.

In some implementations, determining that movement shown by a group of pixels in the second set of images of the scene satisfies motion criteria includes selecting the group of pixels by generating a bounding box around the cluster of motion pixels. For example, the system may generate a bounding box around the motion blob 222. The bounding box can be, for example, the smallest rectangular box that envelopes the cluster of motion pixels. For example, the bounding box can be the smallest rectangular box that envelopes the motion blob 222. In these implementations, the pixels enveloped by the bounding box are included in the selected group of pixels.

In some implementations, determining that movement shown by a group of pixels in the second set of images of the scene satisfies motion criteria includes selecting the group of pixels by detecting, in the second set of images, an object of interest. For example, the system may detect an object of interest such as the person 212. The system may generate a bounding box around the object of interest. For example, the system may generate a bounding box around the person 212. In these implementations, the pixels enveloped by the bounding box are included in the selected group of pixels.

In some implementations, determining that movement shown by the group of pixels in the second set of images of the scene satisfies motion criteria includes determining an average motion flow of the group of pixels. For example, the system can determine an average motion flow of the group of pixels of the motion blob 222. The average motion flow may be, for example, six pixels per frame. Based on the average motion flow of the group of pixels, the system may determine that the movement shown by the group of pixels satisfies motion criteria. Motion criteria can include a minimum motion flow, e.g., of three pixels per frame. Based on average motion flow of the group of pixels of six pixels per frame, and a minimum motion flow of three pixels per frame, the system can determine that the movement shown by the group of pixel of the motion blob 222 satisfies motion criteria.

In some implementations, determining that the movement shown by the group of pixels in the second set of images of the scene satisfies motion criteria includes determining a uniformity of motion direction for the group of pixels. For example, uniformity of motion direction can include a deviation angle, such that the direction of motion flow of the pixels in the motion blob is the same within a deviation angle. The direction of motion of the pixels in the motion blob 222 may be the same within a deviation angle of, for example, twenty degrees from one another. Based on the uniformity of motion direction for the group of pixels, the system may determine that the movement shown by the group of pixels satisfies motion criteria. For example, the motion criteria may be a maximum deviation angle of thirty degrees. The system can determine that the deviation of twenty degrees is less than the maximum deviation angle of thirty degrees, and therefore that the movement shown by the motion blob 222 satisfies motion criteria.

In another example, uniformity of motion direction can include a percentage of pixels that show motion within a direction bin, such as a bin between the angles of one hundred eighty degrees and two hundred ten degrees. The motion blob 222 may include, for example, eighty percent of pixels showing motion within the same direction bin between one hundred eighty degrees and two hundred ten degrees. Motion criteria may be a minimum uniformity of seventy percent of pixels showing motion within a same bin. The system can determine that the uniformity of eighty percent of the pixels of the motion blob 222 showing motion in the same direction bin exceeds the minimum threshold of seventy percent, and therefore that the motion blob 222 meets motion criteria.

The process 300 includes determining that the ground plane in the images corresponds with at least a portion of the group of pixels (310). For example, the camera 110 can compare pixels of the ground plane 125 with the group of pixels corresponding to the image of the person 120. The camera 110 can determine that the ground plane in the images corresponds with at least one pixel of the group of pixels, at least a threshold number of pixels of the group of pixels, or at least a threshold percentage of pixels of the group of pixels.

In some implementations, determining that the ground plane corresponds with at least a portion of the group of pixels includes at least one of (i) determining that a percentage of the group of pixels that correspond to ground plane pixels exceeds a threshold percentage, or (ii) determining that a number of pixels of the group of pixels that correspond to ground plane pixels exceeds a threshold number of pixels. For example, a threshold percentage may be sixty percent. A percentage of the group of pixels of the motion blob 222 that correspond to ground pixels may be seventy-five percent. The system can determine that the percentage of pixels of the motion blob 222 that correspond to ground pixels of seventy-five percent exceeds the threshold percentage of sixty percent.

In another example, a threshold number of pixels may be four hundred pixels. A number of pixels of the group of pixels of the motion blob 222 that correspond to ground pixels may be five hundred pixels. The system can determine that the number of pixels of the motion blob 222 that correspond to ground pixels of five hundred pixels exceeds the threshold number of pixels of four hundred pixels.

The process 300 includes, in response to determining that movement shown by a group of pixels in the second set of images of the scene satisfies motion criteria, and that the ground plane in the images corresponds with at least a portion of the group of pixels, classifying the second set of pixels as showing ground plane based motion (312). Determining that the movement shown by the group of pixels satisfies motion criteria can indicate that the moving object is sufficiently large and is moving at a sufficient speed to be of potential interest to a user, e.g., the resident 108. Determining that the ground plane corresponds with at least a portion of the group of pixels may indicate the presence of ground plane based motion, e.g., an object moving along the ground.

Objects that are moving along the ground may likely be of potential interest to the user. Therefore, once the camera 110 classifies the second set of pixels as showing ground plane based motion, the camera 110 may determine to take an action, such as sending a notification to the user. The notification can indicate, for example, the presence of ground plane based motion, a suspected identity of the moving object, a direction of the moving object, etc.

In some implementations, the process 300 includes, in response to classifying the group of pixels as showing ground plane motion, determining that a ground plane motion event has occurred; and performing one or more monitoring system actions based on the ground plane motion event. For example, in response to classifying the motion blob 222 as showing ground plane motion, the system can determine that a ground plane motion event has occurred. A ground plane motion event can be any event where motion occurs along the ground of the camera scene. Based on determining that the ground plane motion event occurred, the system can perform actions such as transmitting a user notification to a user device, turning on a porch light, ringing a doorbell, etc.

Figure 4:
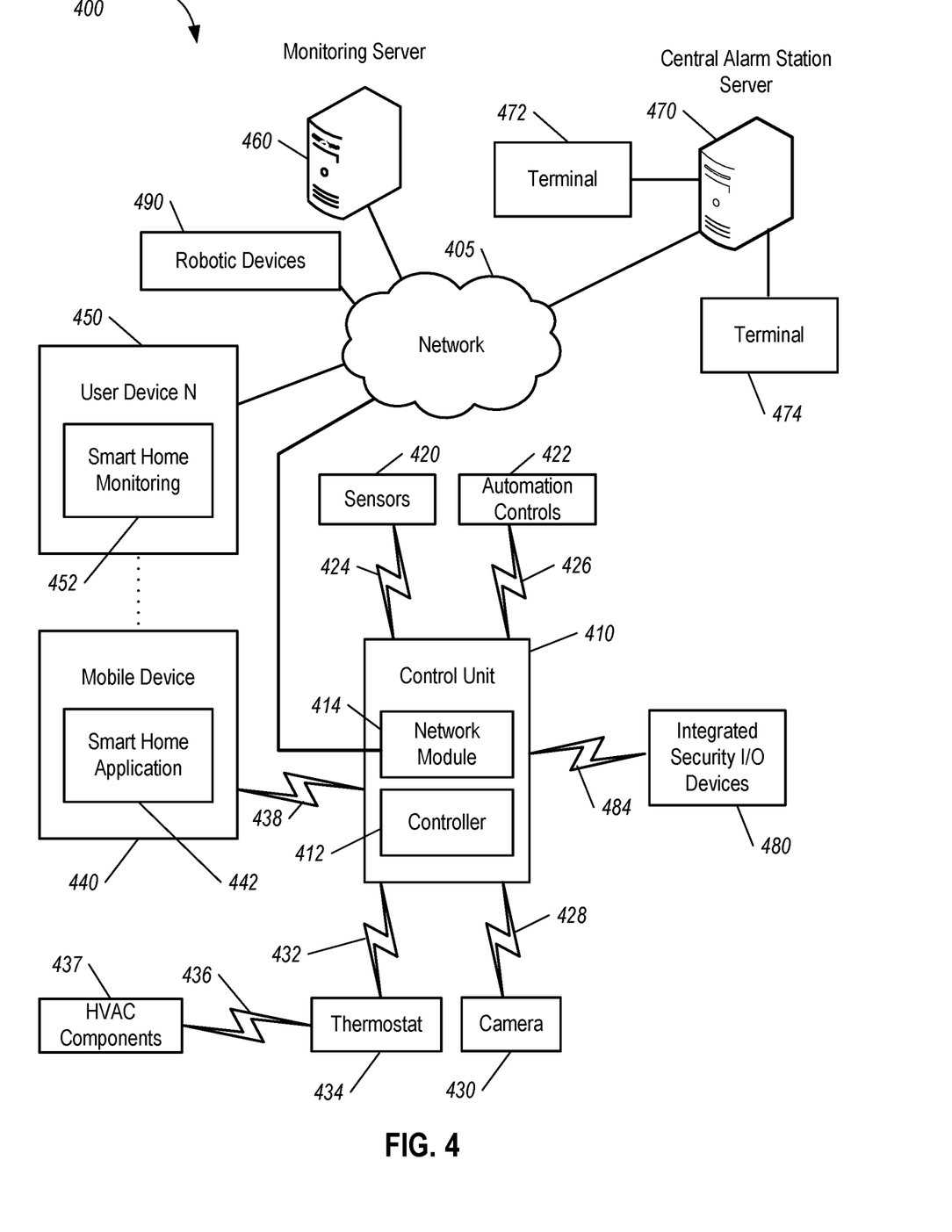
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a doorbell camera, lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. Thermostat 434 is configured to monitor temperature and/or energy consumption of an HVAC system associated with thermostat 434, and is further configured to provide control of environmental (e.g., temperature) settings. In some implementations, thermostat 434 can additionally or alternatively receive data relating to activity at a home and/or environmental data at a home, e.g., at various locations indoors and outdoors at the home. Thermostat 434 can directly measure energy consumption of the HVAC system associated with thermostat, or can estimate energy consumption of the HVAC system associated with thermostat 434, for example, based on detected usage of one or more components of the HVAC system associated with thermostat 434. Thermostat 434 can communicate temperature and/or energy monitoring information to or from the control unit 410 and can control the environmental (e.g., temperature) settings based on commands received from the control unit 410.

In some implementations, thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to thermostat 434 and can control the one or more components of the HVAC system based on commands received from thermostat 434.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, thermostat 434, and the integrated security devices 480 to the controller 412. The sensors 420, the home automation controls 422, the camera 430, thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., resident 108). For example, one or more of the sensors 420, the home automation controls 422, the camera 430, thermostat 434, and the integrated security devices 480 can collect data related to a resident including location information (e.g., if the resident is home or is not home) and provide location information to thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, thermostat 434, and the robotic devices 490 to a pathway over network 405 when the one or more user devices 440 and 450 are farther from the sensors 420, the home automation controls 422, the camera 430, thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, thermostat 434, and the robotic devices 490 to use the direct local pathway or whether the one or more user devices 440 and 450 are far enough from the sensors 420, the home automation controls 422, the camera 430, thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, thermostat 434, and the robotic devices 490 using the direct local pathway. If communication using the direct local pathway is not possible, the one or more user devices 440 and 450 communicate with the sensors 420, the home automation controls 422, the camera 430, thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   obtaining a first set of images of a scene from a camera;
   labeling a first set of pixels of the first set of images as ground plane pixels, wherein a ground plane pixel represents a portion of a surface depicted in the scene;
   labeling a second set of pixels of the first set of images as non-ground plane pixels, wherein a non-ground plane pixel represents a portion of the scene that is out of the depiction of the surface;
   obtaining, from the camera, a second set of images of the scene after the first set of images of the scene is obtained;
   identifying, in the second set of images of the scene, a plurality of pixel groups that each represent motion of a respective object, including determining that an average motion flow of each of the plurality of pixel groups satisfies motion criteria;
   identifying, from the plurality of pixel groups that each represent motion of a respective object, a subset of pixel groups that overlap with the depiction of the surface, wherein a pixel group that overlaps with the depiction of the surface comprises a pixel group having at least one pixel that has a pixel location corresponding to a ground plane pixel in the first set of images;
   tracking, in subsequent images obtained from the camera, motion of the respective objects represented by the subset of pixel groups that overlap with the depiction of the surface; and
   determining not to track, in the subsequent images obtained from the camera, motion of the respective objects represented by the plurality of pixel groups excluding the subset of pixel groups that overlap with the depiction of the surface.

2. The method of claim 1, wherein each image of the first set of images includes a plurality of scene segments, each scene segment comprising a group of pixels in the image that correspond to the same object in the scene.

3. The method of claim 2, wherein labeling the first set of pixels of the first set of images as ground plane pixels comprises:
   for each scene segment:
      assigning a label indicating an object depicted by the scene segment; and
      based on the label indicating the object depicted by the scene segment, classifying the scene segment as a ground-plane segment or a non-ground plane segment; and
   labeling pixels of scene segments classified as ground-plane segments as ground plane pixels.

4. The method of claim 3, comprising:
   generating a ground plane image, the ground plane image comprising:
      a ground plane including the ground-plane segments, wherein each pixel of the ground plane in the ground plane image has a first pixel value; and
      a non-ground plane including the non-ground plane segments, wherein each pixel of the non-ground plane in the ground plane image has a second pixel value,
   wherein each pixel group of the subset of pixel groups has at least one pixel that has a location corresponding to a pixel of the ground plane image that has the first pixel value.

5. The method of claim 1, wherein identifying the plurality of pixel groups that each represent motion of a respective object comprises:
   determining, for each pixel in the second set of images, a motion flow for the pixel;
   based on the motion flow for each pixel, classifying each pixel as a motion pixel or a non-motion pixel; and
   identifying a cluster of motion pixels in the second set of images based on (i) a similarity of flow orientation of the motion pixels to each other and (ii) a proximity of the motion pixels to each other, wherein the cluster of motion pixels comprises a pixel group of the plurality of pixel groups.

6. The method of claim 1, wherein identifying the plurality of pixel groups that each represent motion of a respective object comprises:
   detecting, in the second set of images, an object of interest; and
   generating a bounding box around the object of interest, wherein the pixels enveloped by the bounding box comprise a pixel group of the plurality of pixel groups.

7. The method of claim 1, wherein identifying the plurality of pixel groups that each represent motion of a respective object further comprises:
   determining that a uniformity of motion direction for each of the plurality of pixel groups satisfies motion criteria.

8. The method of claim 1, wherein identifying the subset of pixel groups that overlap with the surface comprises determining, for each of the plurality of pixel groups, that a percentage of the pixel group that has pixel locations corresponding to ground plane pixels in the first set of images satisfies a threshold percentage.

9. The method of claim 1, comprising:
in response to identifying the subset of pixel groups that overlap with the depiction of the surface, determining that at least one ground plane motion event has occurred; and
performing one or more actions based on the at least one ground plane motion event.

10. The method of claim 1, comprising:
generating a ground plane image, including assigning a first pixel value to the first set of pixels; and assigning a second pixel value to the second set of pixels, wherein:
each pixel group of the subset of pixel groups has at least one pixel that has a pixel location corresponding to a pixel in the ground plane image that has the first pixel value.

11. The method of claim 1, wherein tracking the motion of the respective objects represented by the subset of pixel groups that overlap with the depiction of the surface comprises:
generating a bounding box around each of the subset of pixel groups; and
tracking movements of the bounding boxes in the subsequent images obtained from the camera.

12. The method of claim 1, wherein the surface depicted in the scene comprises a walkable surface depicted in the scene.

13. The method of claim 1, wherein identifying the subset of pixel groups that overlap with the surface comprises determining, for each of the plurality of pixel groups, that a number of pixels of the pixel group that has pixel locations corresponding to ground plane pixels in the first set of images satisfies a threshold number of pixels.

14. The method of claim 1, wherein the surface is defined in part by a horizon in the scene.

15. The method of claim 1, wherein the surface depicted in the scene comprises a surface on which one or more objects appear to be positioned.

16. A system comprising one or more computers configured to perform operations comprising:
obtaining a first set of images of a scene from a camera;
labeling a first set of pixels of the first set of images as ground plane pixels, wherein a ground plane pixel represents a portion of a surface depicted in the scene;
labeling a second set of pixels of the first set of images as non-ground plane pixels, wherein a non-ground plane pixel represents a portion of the scene that is out of the depiction of the surface;
obtaining, from the camera, a second set of images of the scene after the first set of images of the scene is obtained;
identifying, in the second set of images of the scene, a plurality of pixel groups that each represent motion of a respective object, including determining that an average motion flow of each of the plurality of pixel groups satisfies motion criteria;
identifying, from the plurality of pixel groups that each represent motion of a respective object, a subset of pixel groups that overlap with the depiction of the surface, wherein a pixel group that overlaps with the depiction of the surface comprises a pixel group having at least one pixel that has a pixel location corresponding to a ground plane pixel in the first set of images;
tracking, in subsequent images obtained from the camera, motion of the respective objects represented by the subset of pixel groups that overlap with the depiction of the surface; and
determining not to track, in the subsequent images obtained from the camera, motion of the respective objects represented by the plurality of pixel groups excluding the subset of pixel groups that overlap with the depiction of the surface.

17. The system of claim 16, wherein each image of the first set of images includes a plurality of scene segments, each scene segment comprising a group of pixels in the image that correspond to the same object in the scene.

18. The system of claim 17, wherein labeling the first set of pixels of the first set of images as ground plane pixels comprises:
for each scene segment:
assigning a label indicating an object depicted by the scene segment; and
based on the label indicating the object depicted by the scene segment, classifying the scene segment as a ground-plane segment or a non-ground plane segment; and
labeling pixels of scene segments classified as ground-plane segments as ground plane pixels.

19. A non-transitory computer-readable medium storing software comprising instructions executable by one or more computers which, upon such execution, cause the one or more computers to perform operations comprising:
obtaining a first set of images of a scene from a camera;
labeling a first set of pixels of the first set of images as ground plane pixels, wherein a ground plane pixel represents a portion of a surface depicted in the scene;
labeling a second set of pixels of the first set of images as non-ground plane pixels, wherein a non-ground plane pixel represents a portion of the scene that is out of the depiction of the surface;
obtaining, from the camera, a second set of images of the scene after the first set of images of the scene is obtained;
identifying, in the second set of images of the scene, a plurality of pixel groups that each represent motion of a respective object, including determining that an average motion flow of each of the plurality of pixel groups satisfies motion criteria;
identifying, from the plurality of pixel groups that each represent motion of a respective object, a subset of pixel groups that overlap with the depiction of the surface, wherein a pixel group that overlaps with the depiction of the surface comprises a pixel group having at least one pixel that has a pixel location corresponding to a ground plane pixel in the first set of images;
tracking, in subsequent images obtained from the camera, motion of the respective objects represented by the subset of pixel groups that overlap with the depiction of the surface; and
determining not to track, in the subsequent images obtained from the camera, motion of the respective objects represented by the plurality of pixel groups excluding the subset of pixel groups that overlap with the depiction of the surface.

20. The non-transitory computer-readable medium of claim 19, the operations comprising:
generating a ground plane image, including assigning a first pixel value to the first set of pixels; and assigning a second pixel value to the second set of pixels, wherein:

each pixel group of the subset of pixel groups has at least one pixel that has a pixel location corresponding to a pixel in the ground plane image that has the first pixel value.

\* \* \* \* \*